United States Patent
Kumar et al.

(10) Patent No.: US 11,323,392 B1
(45) Date of Patent: May 3, 2022

(54) MANAGING SPLIT-BRAIN SCENARIO IN MULTI-HOMED ENVIRONMENT

(71) Applicant: Juniper Networks, Inc., Sunnyvale, CA (US)

(72) Inventors: Sushant Kumar, Bangalore (IN); Aldrin Isaac, San Jose, CA (US); SelvaKumar Sivaraj, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 133 days.

(21) Appl. No.: 16/947,099

(22) Filed: Jul. 17, 2020

(51) Int. Cl.
| | |
|---|---|
| *H04L 49/55* | (2022.01) |
| *H04L 43/0811* | (2022.01) |
| *H04L 45/24* | (2022.01) |
| *H04L 45/02* | (2022.01) |
| *H04L 45/16* | (2022.01) |
| *H04L 41/0654* | (2022.01) |
| *H04L 41/0659* | (2022.01) |

(52) U.S. Cl.
CPC ........ *H04L 49/557* (2013.01); *H04L 41/0654* (2013.01); *H04L 43/0811* (2013.01); *H04L 45/02* (2013.01); *H04L 45/16* (2013.01); *H04L 45/24* (2013.01); *H04L 45/245* (2013.01); *H04L 49/555* (2013.01); *H04L 41/0659* (2013.01)

(58) Field of Classification Search
CPC . H04L 49/557; H04L 49/555; H04L 41/0654; H04L 41/0659; H04L 43/0811; H04L 45/24; H04L 45/245
See application file for complete search history.

(56) References Cited

U.S. PATENT DOCUMENTS

| | | | | |
|---|---|---|---|---|
| 10,749,801 | B2 * | 8/2020 | Dubey | .................... H04L 45/44 |
| 11,206,208 | B2 * | 12/2021 | Malhotra | .................. G06F 9/54 |
| 2015/0172121 | A1 * | 6/2015 | Farkas | .................. H04L 45/245 |
| | | | | 370/218 |
| 2015/0188808 | A1 * | 7/2015 | Ghanwani | ........... H04L 41/0663 |
| | | | | 709/244 |

(Continued)

OTHER PUBLICATIONS

Sajassi et al., "A Network Virtualization Overlay Solution Using Ethernet VPN (EVPN)," RFC 8365, Internet Engineering Task Force (IETF), Mar. 2018, 34 pp.

(Continued)

*Primary Examiner* — Min Jung
(74) *Attorney, Agent, or Firm* — Shumaker & Sieffert, P.A.

(57) ABSTRACT

Techniques are described for managing a split-brain scenario in a multihomed environment by exchanging isolation information between a leaf device and two or more spine devices to which the leaf device is multihomed via a link aggregation group (LAG). The techniques include selecting one of the spine devices as a primary spine device and determining, based on the isolation information, whether the spine devices are isolated from each other. In the split-brain scenario in which all of the spine devices are isolated from each other, the primary spine device is configured to maintain the LAG with the leaf device while the other spine devices mark the LAG with the leaf device as down. In this way, in the split-brain scenario, the leaf device may continue to send traffic to other leaf devices in the leaf layer using the LAG to the primary spine device.

20 Claims, 6 Drawing Sheets

(56) References Cited

U.S. PATENT DOCUMENTS

| | | | | |
|---|---|---|---|---|
| 2017/0163473 | A1* | 6/2017 | Sadana | H04L 47/125 |
| 2017/0257309 | A1* | 9/2017 | Appanna | H04L 12/4633 |
| 2018/0234356 | A1* | 8/2018 | Johnsen | H04L 49/70 |
| 2019/0007301 | A1* | 1/2019 | Kadosh | H04L 45/745 |

OTHER PUBLICATIONS

Sajassi et al., "BGP MPLS-Based Ethernet VPN," RFC 7432, Internet Engineering Task Force (IETF), Feb. 2015, 56 pp.

Mahalingam et al., "Virtual extensible Local Area Network (VXLAN): A Framework for Overlaying Virtualized Layer 2 Networks over Layer 3 Networks," RFC 7348, Independent Submission, Aug. 2014, 23 pp.

"IEEE Standard for Local and metropolitan area networks—Link Aggregation" IEEE Computer Society, Standard 902.1AX-2008, Nov. 3, 2008, 163 pp.

* cited by examiner

MANAGING SPLIT-BRAIN SCENARIO IN MULTI-HOMED ENVIRONMENT

TECHNICAL FIELD

The invention relates to computer networks and, more particularly, to multi-homed environments within data centers.

BACKGROUND

In a typical data center environment, there is a large collection of interconnected servers that provide computing (e.g., compute nodes) and/or storage capacity to run various applications. For example, a data center comprises a facility that hosts applications and services for subscribers, i.e., customers of data center. The data center for example, hosts all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

A data center switching architecture is used to provide subscribers and applications used by the subscribers with access to the data and services housed in the data center. In some examples, the data center switching architecture comprises a multi-tiered architecture in which two or more tiers of network devices are interconnected to aggregate data center traffic from servers and other devices in the data center to edge routers that communicate with other data centers or external networks. In other examples, the data center switching architecture may be flattened into a single tier of network devices directly connected to one another across a fabric backplane to transmit traffic directly between servers, edge routers, and other devices connected to the network devices.

SUMMARY

In general, this disclosure describes techniques for managing a split-brain scenario in a multihomed environment by exchanging isolation information between leaf devices and spine devices as endpoints of a link aggregation group (LAG). A multihomed environment, e.g., in a data center, includes a spine layer having two or more spine devices to which each leaf device in a leaf layer is multihomed via a LAG. The spine devices are interconnected to each other either by direct links or through a route reflector. The split-brain scenario may occur when all of the spine devices become isolated from each other (e.g., either physical connectivity and/or border gateway protocol (BGP) connectivity between the spine devices goes down). When all of the two or more spine devices are isolated from each other, the spine devices are no longer synchronized and, thus, cannot provide redundancy in the multihomed environment.

The techniques described in this disclosure include selecting one of the spine devices as a primary spine device and determining, based on the isolation information, whether the spine devices are isolated from each other. In the split-brain scenario in which all of the spine devices are isolated from each other, the primary spine device is configured to maintain the LAG with the leaf device while the other spine devices mark the LAG with the leaf device as down. In this way, in the split-brain scenario, the leaf device may continue to send traffic to other leaf devices in the leaf layer using the LAG to the primary spine device.

The techniques include sending isolation local information, from each spine device to the leaf device over the LAG, including a spine device ID of the respective spine device and an indication of whether the respective spine device is isolated from the other spine devices of the LAG. The techniques further include sending isolation primary information, from the leaf device to each spine device over the LAG, including a spine device ID of the primary spine device and an indication of whether all of the two or more spine devices are isolated. Based on the exchanged isolation information, each of the spine devices may determine whether it is the primary spine device and whether all of the spine devices are isolated, and manage the LAG with the leaf device accordingly. In some examples, the isolation local information and the isolation primary information may each comprise a new type-length-value (TLV) element of the link aggregation control protocol (LACP). The leaf device and the two or more spine devices periodically exchange LACP data units including the new TLV elements over the LAG.

In one example, this disclosure is directed to a method comprising sending, by a first spine device of two or more spine devices to which a leaf device is multihomed via a LAG and to the leaf device, isolation local information including a first spine device ID of the first spine device and an indication of whether the first spine device is isolated from the other spine devices of the two or more spine devices; receiving, by the first spine device and from the leaf device, isolation primary information including a second spine device ID of a primary spine device selected from among the two or more spine devices and an indication of whether all of the two or more spine devices are isolated; determining, by the first spine device, that the first spine device is isolated from the other spine devices of the two or more spine devices; and in response to determining that the first spine device is the primary spine device and that all of the two or more spine devices are isolated, maintaining, by the first spine device, the LAG with the leaf device.

In another example, this disclosure is directed to a method comprising receiving, by a leaf device and from each spine device of two or more spine devices to which the leaf device is multihomed via a LAG, isolation local information including a spine device ID of the respective spine device and an indication of whether the respective spine device is isolated from the other spine devices of the two or more spine devices; selecting, by the leaf device, a primary spine device from among the two or more spine devices based on the spine device IDs of the two or more spine devices; and in response to determining that all of the two or more spine devices are isolated, sending, by the leaf device and to at least the primary spine device, isolation primary information including an indication that all spine devices are isolated, wherein the indication that all spine devices are isolated instructs the primary spine device to maintain the LAG with the leaf device.

In a further example, this disclosure is directed to a network system comprising two or more spine devices connected to each other; and a leaf device multihomed to the two or more spine devices via a LAG. Each spine device of the two or more spine devices is configured to send, to the leaf device, isolation local information including a spine device ID of the respective spine device and an indication of whether the respective spine device is isolated from the other spine devices of the two or more spine devices. The leaf device is configured to select a primary spine device from among the two or more spine devices based on the spine device IDs of the two or more spine devices, and send, to at least the primary spine device, isolation primary information including a spine device ID of the primary spine device and an indication of whether all of the two or more spine devices are isolated. The primary spine device is configured to, in response to determining that all of the two or more spine devices are isolated, maintain the LAG with the leaf device.

The details of one or more examples are set forth in the accompanying drawings and the description below. Other features, objects, and advantages will be apparent from the description, drawings, and from the claims.

BRIEF DESCRIPTION OF DRAWINGS

Like reference characters refer to like elements throughout the figures and description.

DETAILED DESCRIPTION

Figure 1:
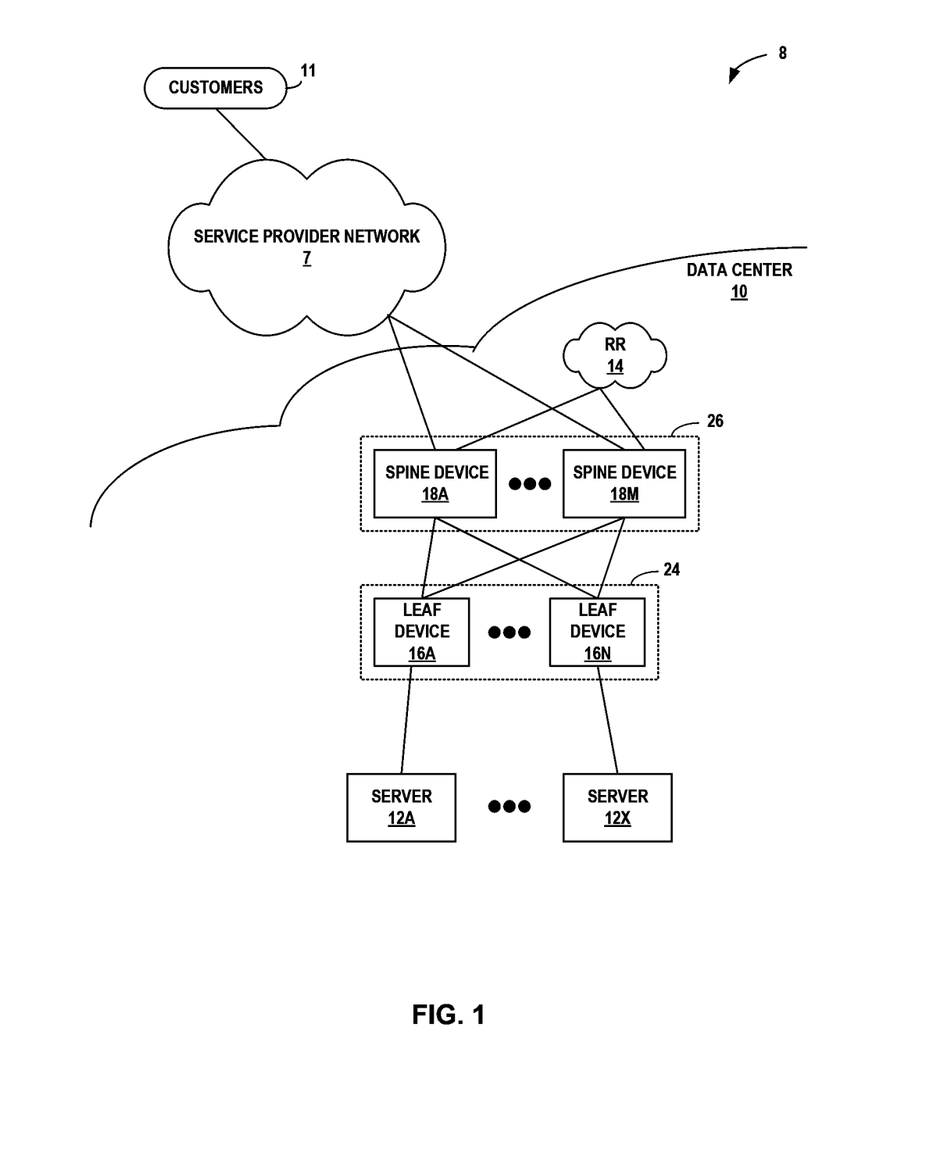
FIG. 1 is a block diagram illustrating an example network having a data center in which examples of the techniques described herein may be implemented.

FIG. 1 is a block diagram illustrating an example network system 8 having a data center 10 in which examples of the techniques described herein may be implemented. Network system 8 in the example of FIG. 1 includes data center 10 interconnected with customer networks associated with customers 11 via a service provider network 7. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (collectively, "servers 12") interconnected via a fabric backbone that includes leaf devices 16A-16N (collectively, "leaf devices 16") in a leaf layer 24 that are each multihomed to two or more spine devices 18A-18M (collectively, "spine devices 18") in a spine layer 26. Spine devices 18 may be connected to each other directly via a mesh of links (not shown in FIG. 1) or through a route reflector (RR) 14. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example illustrated in FIG. 1, leaf devices 16 and spine devices 18 provide servers 12 with connectivity to service provider network 7. Spine devices 18 and leaf devices 16 may be network devices capable of L3 switching and routing. In some examples, leaf devices 16 may comprise top-of-rack (TOR) or access switches that enable servers 12 to access the fabric backbone and provide uplinks to spine devices 18. In some examples, spine devices 18 may comprise chassis or aggregation switches that aggregate traffic flows and provide high-speed connectivity between leaf devices 16. In addition, spine devices 18 may perform L3 routing to route network traffic between data center 10 and customers 11 by service provider network 7. Leaf devices 16 and spine devices 18 may each include one or more processors and a memory, and that are capable of executing one or more software processes.

Leaf devices 16 and spine devices 18 may use a border gateway protocol (BGP) as a control plane or routing protocol in the fabric backbone to advertise prefixes, perform traffic engineering, and tag traffic. Spine devices 18 may support an overlay network (not shown) in data center 10, such as a Virtual Extensible Local Area Network (VXLAN)-Ethernet Virtual Private Network (EVPN) overlay network. In this example, spine devices 18 may support EVPN instances that function as a control plane to exchange layer 2 (L2) reachability information across data center 10 using the fabric backbone. EVPN is a media access control (MAC) address learning control plane for overlay networks. Spine device 18 may further use VXLAN as a data plane encapsulation tool for the overlay network that encapsulates and tunnels traffic between the network devices in the fabric backbone. For example, VXLAN is a tunneling protocol that encapsulates L2 frames in L3 packets enabling creation of virtualized L2 subnets or segments that span physical L3 networks, such as the fabric backbone. In other examples, spine devices 18 may support other types of overlay networks, such as a Multi-Protocol Label Switching (MPLS)-EVPN.

EVPN technology standards are described in more detail in Sajassi, A., et al., "A Network Virtualization Overlay Solution Using Ethernet VPN (EVPN)," IETF RFC 8365, March 2018; Sajassi, A., et al., "BGP MPLS-Based Ethernet VPN," IETF RFC 7432, February 2015; and Mahalingam, M., et al., "Virtual eXtensible Local Area Network (VXLAN): A Framework for Overlaying Virtualized Layer 2 Networks over Layer 3 Networks," IETF RFC 7348, August 2014, each of which is incorporated herein by reference. The EVPN technology standards introduce the concept of link aggregation groups (LAGs) in EVPNs through the use of Ethernet segments. Ethernet segments in an EVPN include links collected into a bundle and assigned a unique number, the Ethernet segment identifier (ESI). Links from multiple standalone nodes may be assigned into the same ESI, introducing node level redundancy to devices in a VXLAN-EVPN overlay network. The bundled links numbered with an ESI may be referred to as an ESI-LAG.

As illustrated in FIG. 1, spine layer 26 includes two or more spine devices 18 to which each of leaf devices 16 are multihomed. For example, leaf device 16A is multihomed to the two or more spine devices 18. The set or bundle of Ethernet links between leaf device 16A and the two or more spine devices 18 comprises an ESI-LAG. In this example, each of spine devices 18 is assigned into the same ESI-LAG with leaf device 16A. In addition, each of spine devices 18 may be assigned into ESI-LAGs to the other leaf devices 16 in leaf layer 24. In this way, one or more of spine devices 18 in spine layer 26 may provide node level redundancy to leaf devices 16.

In order to form and maintain the ESI-LAG between, e.g., leaf device 14A and spine devices 18, spine devices 18 may be either directly connected in a mesh of links or through RR 14. Connectivity between spine devices 18 is configured to ensure synchronization between spine devices 18 to maintain redundant information and, hence, provide redundancy to leaf devices 16. There are instances where one or more of spine devices 18 may become isolated from the other spine devices (e.g., BGP connectivity to the other spine devices goes down). Conventionally, when a spine device, observes that BGP is down such that it is isolated from its neighbors, the spine device brings down the local ESI-LAG with each of the leaf devices and sends a link aggregation control protocol (LACP) data unit including an out-of-sync indication to each of the leaf devices. This technique works fine as long as at least two of the spine devices remain in communication with each other to provide redundancy to the leaf devices.

When all of the spine devices lose connectivity to the route reflector or to each other, such that the spine devices are isolated from one another, all of the spine devices locally bring down their ESI-LAG with each of the leaf devices and, thus, traffic between the leaf devices cannot flow. The problem may occur when the spine layer includes two spine devices and the link between the two spine devices goes down. The loss of communication between the spine devices causes a split-brain scenario to occur, in which the two spine devices are unable to remain synchronized and maintain redundant information due to their isolation from one another. A core-isolation feature, intended to detect and avoid isolation of core or spine devices, causes both of the spine devices to bring down their ESI-LAGs with each of the leaf devices. EVPN does not provide any process by which the leaf devices may continue to exchange traffic during a split-brain scenario in the spine layer.

In general, this disclosure describes techniques for managing the split-brain scenario in a multihomed environment by exchanging isolation information (e.g., isolation local information and isolation primary information) between leaf devices 16 and spine devices 18 as endpoints of LAGs to ensure that one of the spine devices, e.g., spine device 18A, maintains a LAG with each of leaf devices 16 when all of the spine devices 18 lose connectivity to each other and become isolated from each other. The techniques described in this disclosure include selecting one of spine devices 18, e.g., spine device 18A, as a primary spine device and determining, based on the exchanged isolation information, whether all of spine devices 18 are isolated from each other. In the split-brain scenario in which all of spine devices 18 are isolated from each other (meaning, spine devices 18 are unavailable in terms of connectivity with respect to other ones of spine devices 18), primary spine device 18A is configured to maintain the LAG with each of leaf devices 14 while the other spine devices mark the LAG to the leaf device as down (or, in other words, out-of-sync with the LAG and unavailable). In this way, in the split-brain scenario, the leaf devices 14 may continue to send traffic to each other using the LAG to primary spine device 18A.

More specifically, the techniques described in this disclosure include sending isolation local information, from each of spine devices 18 to each of the leaf devices 16 over the respective LAG, including a spine device ID of the respective spine device and an indication of whether the respective spine device is isolated from the other spine devices 18 participating in the LAG. The techniques further include sending isolation primary information, from each of leaf devices 16 to each of spine devices 18 over the respective LAG, including a spine device ID of the primary spine device selected by leaf devices 16 and an indication of whether all of spine devices 18 are isolated.

Based on the exchanged isolation information, each of spine devices 18 may determine whether it is the primary spine device and whether all of spine devices 18 are isolated, and manage the LAG with each of leaf devices 16 accordingly. In some examples, the isolation local information and the isolation primary information may each comprise a new type-length-value (TLV) element of the LACP. Leaf devices 16 and spine devices 18 periodically exchange LACP data units including the new TLV elements over the LAGs.

Figure 2:
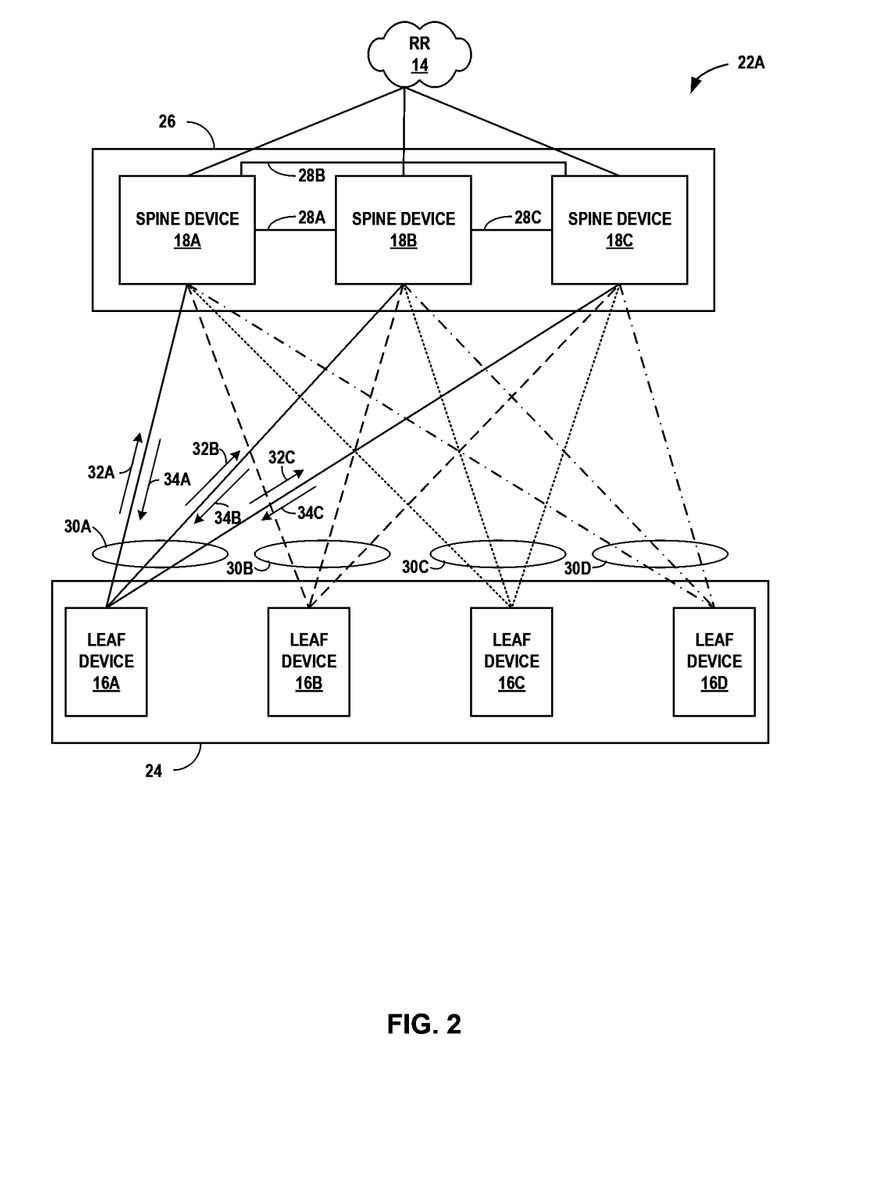
FIG. 2 is a block diagram illustrating an example multihomed environment within a data center including network devices arranged in a spine and leaf layer topology.

FIG. 2 is a block diagram illustrating an example EVPN-VXLAN multihomed environment over a fabric backbone 22A within data center 10 including network devices 16, 18 arranged in a spine and leaf layer topology. The architecture illustrated in FIG. 2 is merely exemplary and, in other examples, fabric backbone 22A may conform to a different architecture. In the example of FIG. 2, four leaf devices 16A-16D are arranged in leaf layer 24 and three spine devices 18A-18C are arranged in spine layer 26. As illustrated in FIG. 2, each of leaf devices 16 is multihomed to spine devices 18 via an ESI-LAG 30A-30D (collectively, "ESI-LAGs 30"). In this topology, there are no direct physical connections between leaf devices 16 within leaf layer 24. Spine devices 18 are connected to each other directly via a mesh of links 28A-28C and/or indirectly via route reflector 14.

As discussed with respect to FIG. 1, spine devices 18 and leaf devices 16 may be network devices capable of L3 switching and routing. In some examples, leaf devices 16 may comprise specialized TOR or access switches that provide access to fabric backbone 22A, and spine devices 18 may comprise specialized chassis or aggregation switches that aggregate traffic flows and provide connectivity between leaf devices 16. In other examples, leaf devices 16 and spine devices 18 may comprise the same type of network device capable of providing both access and aggregation functionality.

Fabric backbone 22A may include distributed data and control planes across leaf devices 16 and spine devices 18 with centralized management through which an administrator (not shown) can interact with any of the leaf devices 16 and spine devices 18. For example, the administrator may be connected to each of leaf devices 16 and spine devices 18 to monitor, configure, or otherwise manage the network devices. For example, the administrator may access each of the network devices via a command line interface (CLI).

This disclosure describes techniques for exchanging isolation information in data units sent over ESI-LAGs 30 to ensure that one of the spine devices 18, e.g., spine device 18A, keeps the ESI-LAGs 30 up with leaf devices 16 when all of spine devices 18 lose connectivity to each other and become isolated. For example, the isolation information may be included in LACP data units (LACPDUs) sent over ESI-LAGs 30 to periodically exchange state information between leaf devices 16 and spine devices 18. Leaf devices 16 and spine devices 18 use the LACP running over the ESI-LAGs 30 to exchange information regarding the spine devices 18 participating in the ESI-LAGs 30 with the respective leaf devices 14, and information regarding the BGP connectivity state of the spine devices 18 both individually and as a whole. This disclosure introduces the notion of a "primary" spine device that will keep its local ESI-LAG up with each leaf device when all of spine devices 18 are isolated. In order to achieve this, leaf devices 16 are configured to consolidate the information received from all of spine devices 18 in LACPDUs and echo the information back to spine devices 18.

In accordance with the disclosed techniques, each of the leaf devices 16 is aware of all the spine devices 18 connected to it through a respective one of ESI-LAGs 30. According to the disclosed techniques, each of spine devices 18 adds isolation local information to the LACPDUs sent over ESI-LAGs 30 connected to each of leaf devices 16. The isolation local information includes a spine device ID of the respective one of spine devices 18 and an indication of whether the respective one of spine devices 18 is isolated from the other spine devices 18 participating in the respective one of ESI-LAGs 30. For example, spine device 18A sends LACPDUs 34A including isolation local information for spine device 18A to leaf device 16A over ESI-LAG 30A. Spine device 18B, 18C similarly sends LACPDUs 34B, 34C including isolation local information for spine device 18B, 18C to leaf device 16A over ESI-LAG 30A. As one example, the isolation local information may comprise a new TLV element of LACP, referred to using a TLV type of "ESI Isolation Local Information," as shown below.

---

TLV_type = ESUsolation_Local_Information
ESI_Isolation_Local_Information_Length = 7
Isolation_Local_IP: Lo0 IP of the Local Spine.
Isolation_State_Flags = ISOLATED/NOT_ISOLATED

---

Each of leaf devices 16 consolidates the isolation local information received from each of spine devices 18, and selects a primary spine device from among spine devices 18 based on the spine device IDs included in the isolation location information. The spine device IDs of spine devices 18 may be loopback addresses (Lo0 IP) of spine devices 18 (as shown in the above example TLV type) or LACP default system IDs of the spine devices 18. An LACP default system ID of a given spine device is the chassis MAC address and is unique to the chassis. IT should be noted that an LACP default system ID is different than an LACP configured system ID, which is manually configured to be the same on all spine devices.

In one example, leaf device 16A may select the primary spine device as the one of spine devices 18 that has a lowest spine device ID from among the spine device IDs of spine devices 18. In other examples, leaf device 16A may select the primary spine device as the one of spine devices 18 that has a highest spine device ID from among the spine device IDs of spine devices 18. In general, leaf device 16A may select the primary spine device according to any logic as long as all of leaf devices 16 within leaf layer 24 select the same one of spine devices 18 within spine layer 26 as the primary spine device. The selection of the primary spine device does not change based on the local isolation state of the selected spine device. The selection of the primary spine device is fixed as long as leaf devices 16 continue receiving LACPDUs 34 from the primary spine device. However, in the case of a LACP timeout or an interface down notification on the link to the primary spine device, e.g., spine device 18A, leaf devices 16 will select a new primary spine device from among the remaining spine devices 18B and 18C. For example, leaf devices 16 may select the new primary spine device as the spine device that has the lowest Lo0 IP from among spine devices 18B and 18C.

According to the disclosed techniques, each of leaf devices 16 adds isolation primary information to the LACPDUs sent over ESI-LAGs 30 connected to each of spine devices 18. The isolation primary information includes a spine device ID of the primary spine device and an indication of whether all of spine devices 18 are isolated from each other. For example, leaf device 16A sends LACPDUs 32 including isolation primary information to each of spine devices 18 over ESI-LAG 30A. As one example, the isolation primary information may comprise a new TLV element of LACP, referred to using a TLV type of "ESI Isolation Primary Information," as shown below.

---

TLV_type = ESI_Isolation_Primary_Information
ESI_Isolation_Primary_Information Length = 7
Isolation_Primary_IP: Lowest among the Lo0 IPs of all spines.
All_Isolated_State = FALSE, if BGP is up on at least one of the spines.

---

An example LACPDU exchange between a given leaf device, e.g., leaf device 16A, and spine devices 18 is described here. Spine device 18A sends LACPDU 34A carrying the isolation local information to leaf device 16A, in which the isolation local information includes the loopback address (Lo0 IP) of spine device 18A (e.g., 10.1.1.1) and "isolation state flags" set to "not isolated." Spine devices 16B and 16C send similar LACPDUs 34B and 34C to leaf device 16A identifying their Lo0 IPs (e.g., 10.1.1.2 and 10.1.1.3, respectively). In response, leaf device 16A choses the one of spine devices 18 having the lowest Lo0 IP (i.e., spine device 18A) as the primary spine device. Leaf device 16A then sends LACPDUs 32 carrying the isolation primary information to each of spine devices 18, in which the isolation primary information includes the loopback address of primary spine device 18A (e.g., 10.1.1.1) and an "all isolated state" set to "false."

An example LACPDU exchange between a given leaf device, e.g., leaf device 16A, and spine devices 18 using LACP default system IDs (instead of loopback addresses) as the spine device IDs to identify the spine devices is described here. Spine device 18A sends LACPDU 34A carrying the isolation local information to leaf device 16A, in which the isolation local information includes the default system ID of spine device 18A (e.g., 00:00:01:02:03:01) and isolation state flags set to "not isolated." Spine devices 16B and 16C send similar LACPDUs 34B and 34C to leaf device 16A identifying their default system IDs (e.g., 00:00:01:02:03:02 and 00:00:01:02:03:03, respectively). In response, leaf device 16A choses the one of spine devices 18 having the lowest default system ID (i.e., spine device 18A) as the isolation primary spine device. Leaf device 16A then sends LACPDUs 32 carrying the isolation primary information to each of spine devices 18, in which the isolation primary information includes the default system ID of primary spine device 18A (e.g., 00:00:01:02:03:01) and an all isolated state set to "false."

In the example of FIG. 2 in which three spine devices 18 are participating in each of ESI-LAGs 30, a core-isolation feature running on each of spine devices 18 may be used to enable each of spine devices 18 to determine when it is isolated from the other spine devices 18 participating in ESI-LAGs 30. For example, a given one of spine devices 18, e.g., spine device 18A, may use the core-isolation feature to detect when BGP connectivity goes down either on links 28A, 28B directly connected to spine devices 18B, 18C or on the link to RR 14. Based on detecting that BGP is down, spine device 18A may determine that it is isolated from the other spine devices 18B, 18C. Spine device 18A then sends LACPDUs 34A to leaf device 16A over ESI-LAG 30A carrying the isolation local information including the isolation state flags set to "isolated" to indicate that spine device 18A is isolated. Although not shown in FIG. 2, spine device 18A sends similar LACPDUs indicating that it is isolated to leaf devices 16B-16D over ESI-LAGs 30B-30D, respectively.

In response to receipt of LACPDUs 34A indicating that spine device 18A is isolated, leaf device 16A determines whether all of spine devices 18 participating in ESI-LAG 30A are isolated based on isolation state flags received from the other spine devices 18. For example, if spine devices 18B and 18C most recently sent isolation local information including isolation state flags set to "not isolated," then the all isolated state remains as "false." If spine devices 18B and 18C later become isolated from each other and send isolation local information include isolation state flags set to "isolated," then leaf device 16A sets the all isolated state to "true." Leaf device 16A then sends LACPDUs 32 to spine devices 18 over ESI-LAG 30A carrying the isolation primary information including the all isolated state set to "true" to indicate that all of spine devices 18 are isolated.

Returning to spine device 18A, in response to determining that it is isolated, spine device 18A determines whether it is the primary spine device by matching its spine device ID to the primary spine device ID included in the isolation primary information received from leaf devices 16. Spine device 18A also determines whether all spine devices 18 are isolated based on whether the all isolated state included in the isolation primary information is set to "true." In some cases, spine device 18A may also take its own isolation into account when determining whether all spine devices 18 are isolated.

If spine device 18A is the primary spine device and the all isolated state is set to "true," primary spine device 18A locally maintains ESI-LAG 30A with leaf device 16A. Primary spine device 18A may similarly maintain ESI-LAGs 30B-30D with leaf devices 16B-16D, respectively. In all other cases (e.g., where spine device 18A is not the primary spine device or where the all isolation state is set to "false"), spine device 18A marks ESI-LAG 30A locally down and sends LACPDUs 34A including an indication that the link with leaf device 16A is out-of-sync with ESI-LAG 30A. In these cases, spine device 18A may perform similar functions with respect to ESI-LAGs 30B-30D.

In a scenario where primary spine device 18A is isolated from the other spine devices 18, spine device 18A continues to operate as the primary spine device. For example, after primary spine device 18A becomes isolated and marks its local ESI-LAGs as down, primary spine device 18A may later receive LACPDUs 32A from leaf device 14A carrying isolation primary information including the all isolated state set to "true" (where it was "false" earlier). In response, primary spine device 18A brings ESI-LAG 30A locally back up and starts sending LACPDUs 34A including in-sync indications to the leaf device 14A. Spine device 18A may perform similar functions with respect to ESI-LAGs 30B-30D. In this way, primary spine device 18A maintains the ESI-LAGs 30 even when connectivity between the other spine devices 18 and/or RR 14 goes down. As such, leaf devices 16 may continue to send traffic to each other using the ESI-LAGs 30 to primary spine device 18A.

Figure 3:
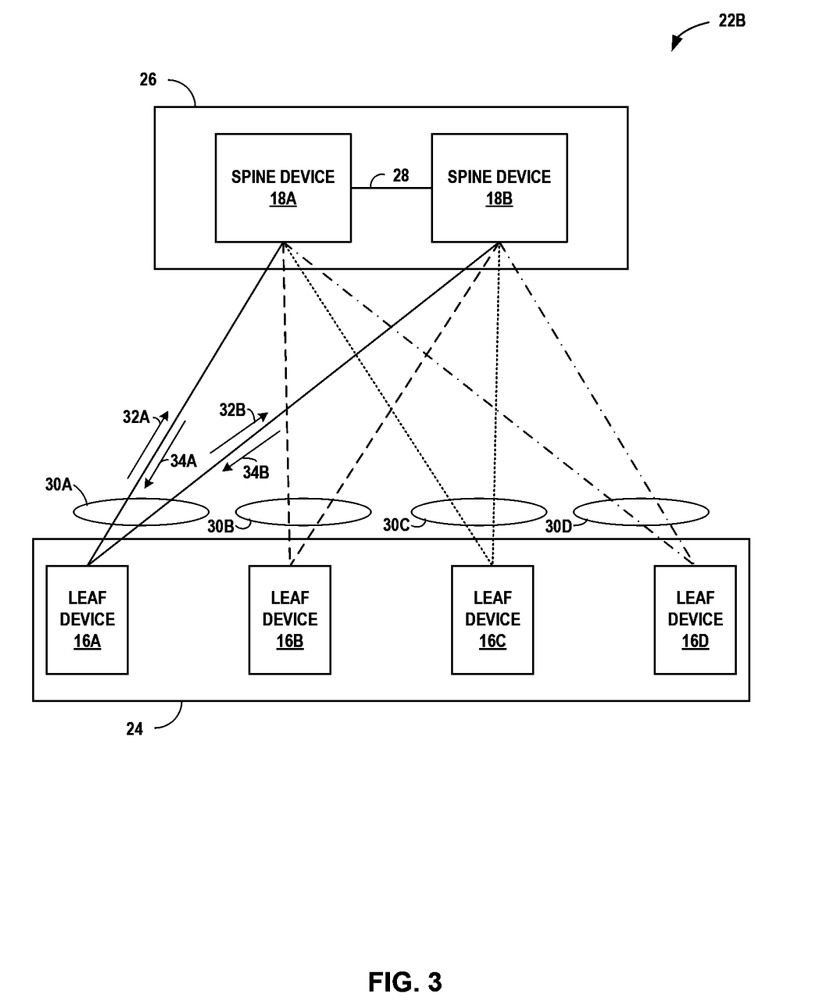
FIG. 3 is a block diagram illustrating another example multihomed environment within a data center including network devices arranged in a spine and leaf layer topology.

FIG. 3 is a block diagram illustrating another example EVPN-VXLAN multihomed environment over a fabric backbone 22B within data center 10 including network devices 16, 18 arranged in a spine and leaf layer topology. The architecture illustrated in FIG. 3 is merely exemplary and, in other examples, fabric backbone 22B may conform to a different architecture. In the example of FIG. 3, four leaf devices 16A-16D are arranged in leaf layer 24 and two spine devices 18A-18C are arranged in spine layer 26. As illustrated in FIG. 3, each of leaf devices 16 is multihomed to spine devices 18 via an ESI-LAG. In this topology, there are no direct physical connections between leaf devices 16 within leaf layer 24. Spine devices 18 are directly connected to each other via core interface 28 without a route reflector. Spine devices 18 and leaf devices 16 within fabric backbone 22B exchange LACPDUs including the isolation local information and isolation primary information in the same manner as described with respect to FIG. 2.

When BGP connectivity over core interface 28 between spine device 18A and spine device 18B goes down, it leads to a split-brain scenario as described above. In the example of FIG. 3 in which only two spine devices 18 are participating in each of ESI-LAGs 30, use of the core-isolation feature would result in both spine devices 18A, 18B being isolated from the core and bringing their ESI-LAGs with leaf devices 16 down. By disabling the core-isolation feature, however, all the ESI-LAGs would remain up on both of spine devices 18A, 18B, which is a problem because spine devices 18A, 18B can no longer synchronize with each other over core interface 28.

In accordance with the disclosed techniques, in the case where only two spine devices 18A, 18B are participating in each of ESI-LAGs 30, an administrator (not shown) may turn off the core-isolation feature on each of spine devices 18A, 18B and turn on a core interface tracking feature via CLI knobs. The core interface tracking feature running on each of spine devices 18 may be used to enable each of spine devices 18 to determine when it is isolated from the other spine device participating in ESI-LAGs 30. For example, spine device 18A may use the core interface tracking feature to monitor a state of core interface 28 between spine device 18A and spine device 18B, and determine that core interface 28 is down based on an observed change in the state of core interface 28. Spine device 18B may also use the core interface tracking feature to make the same determination.

As one example, each of spine devices 18A, 18B may be configured to monitor core interface 28 (e.g., xe-0/0/0.0 running underlay internal gateway protocol (IGP)) for any state change via a new "track core interface" CLI knob, as shown below.

```
regress@PE1_re> show configuration interfaces ae0
esi {
    00:33:33:33:33:33:33:33:33:33;
    all-active;
}
aggregated-ether-options {
```

```
lacp {
    system-id 00:00:00:0a:0b:0c; # configured LACP
        system ID
    track-core-interface <IFL>#CLI, e.g., xe-0/0/0.0
        running underlay IGP
    }
}
```

Based on observing that core interface 28 is down, spine device 18A determines that it is isolated from spine device 18B. Spine device 18A then sends LACPDUs 34A to leaf device 16A over ESI-LAG 30A carrying the isolation local information including the isolation state flags set to "isolated" to indicate that spine device 18A is isolated. Although not shown in FIG. 3, spine device 18A sends similar LACPDUs indicating that it is isolated to leaf devices 16B-16D over ESI-LAGs 30B-30D, respectively.

In response to determining that spine device 18A isolated, spine device 18A determines whether it is the primary spine device by matching its spine device ID to the primary spine device ID included in the isolation primary information received from leaf devices 16. Spine device 18A also determines whether all spine devices 18 are isolated. In the example of FIG. 3 in which only two spine devices 18A, 18B are participating in each of ESI-LAGs 30, spine device 18A may determine that all spine devices 18 are isolated based on its own isolation without having to receive the isolation primary information including the all isolation state set to "true" from leaf device 16A.

If spine device 18A is the primary spine device, primary spine device 18A locally maintains ESI-LAG 30A with leaf device 16A. Primary spine device 18A may similarly maintain ESI-LAGs 30B-30D with leaf devices 16B-16D, respectively. Conversely, spine device 18B marks ESI-LAG 30A locally down and sends LACPDUs 34B including an indication that the link with leaf device 16A is out-of-sync with ESI-LAG 30A. Spine device 18B may perform similar functions with respect to ESI-LAGs 30B-30D. In this way, primary spine device 18A maintains the ESI-LAGs 30 even when core interface 28 between spine device 18A and spine device 18B goes down. As such, leaf devices 16 may continue to send traffic to each other using the ESI-LAGs 30 to primary spine device 18A.

Figure 4:
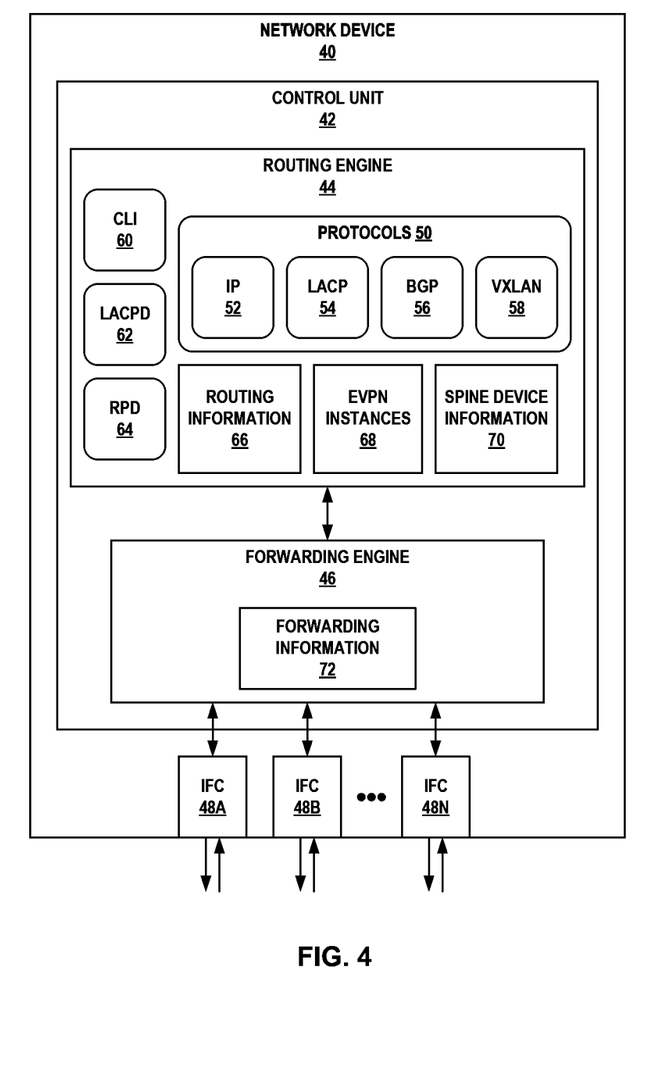
FIG. 4 is a block diagram illustrating an example network device configured to operate in accordance with the techniques of this disclosure.

FIG. 4 is a block diagram illustrating an example network device 40 configured to operate in accordance with the techniques of this disclosure. Network device 40 may operate as any one of leaf devices 16 or spine devices 18 from FIGS. 1-3.

In the illustrated example of FIG. 4, network device 40 includes a control unit 42 with a routing engine 44 that provides control plane functionality for the network device and a forwarding engine 46 that provides forwarding or data plane functionality for the network device to send and receive traffic by a set of interface cards 48A-48N (collectively, "IFCs 48") that typically have one or more physical network interface ports. Forwarding engine 46 performs packet switching and forwarding of incoming data packets for transmission over a network.

As shown in FIG. 4, forwarding engine 46 includes forwarding information 72 that stores forwarding data structures associating network destinations with next hops and outgoing interfaces. Although not shown in FIG. 4, forwarding engine 46 may comprise a central processing unit (CPU), memory and one or more programmable packet-forwarding application-specific integrated circuits (ASICs).

Routing engine 44 includes various protocols 50 that perform routing functions for network device 40. In the illustrated example of FIG. 4, protocols 50 include IP 52 and BGP 56 as routing protocols used to exchange routing information with other network devices in a network, e.g., a fabric backbone, in order to discover the network topology and update routing information 66. In this example, BGP 56 is the routing protocol used to configure routing sessions between network device 40 and the other network devices in the network. In other examples, protocols 50 may include other routing protocols, such as internal gateway protocol (IGP).

Network device 40, when operating as a spine device within a fabric backbone of a data center, may support overlay networks on top of the fabric backbone. For example, network device 40 supports EVPN instances 68 that function as a L2 control plane for overlay networks. In addition, protocols 50 also include VXLAN 58 as a tunneling protocol used as a data plane encapsulation tool for the overlay networks. More specifically, network device 40 may use VXLAN 58 to encapsulate L2 traffic and tunneling the traffic over the L3 fabric backbone. In other examples, network device 40 may use MPLS-based protocols to create overlay networks on top of the fabric backbone.

Protocols 50 further include LACP 54 used to signal LAGs between leaf devices and spine devices, and, in accordance with the disclosed techniques, exchange isolation information between leaf devices and spine devices. For example, network device 40 may use the ESI isolation local information TLV element of LACP 54 to exchange spine device IDs, such as loopback addresses or LACP default system IDs, of spine devices participating in an ESI-LAG, and to exchange isolation state flags as local indications of whether the spine devices are isolated from the other spine devices participating in the ESI-LAG. In addition, network device 40 may use the ESI isolation primary information TLV element of LACP 54 to exchange the spine device ID of the primary spine device selected by the leaf devices, and to exchange an all isolated state flag as a global indication of whether all of the spine devices participating in the ESI-LAG are isolated from each other. Network device 40 may consolidate and store the isolation information, such as the spine device IDs, the primary spine device ID, and the local and global isolation state flags, in spine device information 70. In some examples, network device 40 may store spine device information 70 for each of EVPN instances 68.

Routing information 66 may describe the topology of the network in which network device 40 resides, and may also describe various routes within the network and the appropriate next hops for each route, i.e., the neighboring routing devices along each of the routes. Routing engine 44 analyzes the information stored in routing information 66 to generate forwarding information 72. Routing engine 44 installs forwarding data structures into forwarding information 72 within forwarding engine 46. Forwarding information 72 associates network destinations with specific next hops and corresponding interface ports within the data plane.

In the example of FIG. 4, routing engine 44 includes a command line interface (CLI) 60 that provides access for an administrator (not shown) to monitor, configure, or otherwise manage network device 40. Routing engine 44 also includes a LACP daemon (LACPD) 62 as a user-level process that executes LACP 54 to exchange state information with partner routers or switches participating in a LAG. In addition, routing engine 44 includes a routing protocol daemon (RPD) 64 as a user-level process that executes the routing protocols, e.g., BGP 56, to communicate with peer routers or switches, maintain and update one or more routing tables in routing engine 44, and create one or more forwarding tables for installation in forwarding engine 46, among other functions.

In the case where network device 40 is operating as a leaf device of an ESI-LAG, LACPD 62 selects one of the spine devices participating in the ESI-LAG as the primary spine device based on the spine device IDs of the spine devices stored in spine device information 70. As one example, LACPD 62 may select the primary spine device as the one of the spine devices that has a lowest spine device ID from among the spine device IDs for the ESI-LAG. LACPD 62 may be configured to only change its selection of the primary spine device based on detecting a failure of the link to the primary spine device, and not based on the local isolation state of the primary spine device.

In the case where network device 40 is operating as a spine device of an ESI-LAG, RPD 64 executes a core-isolation feature used to detect when BGP 56 goes down between network device 40 and the other spine devices participating in the ESI-LAG. Upon detecting that BGP 56 has gone down, RPD 64 sends an internal core-isolation message to LACPD 62. Based on receipt of the internal core-isolation message, LACPD 62 determines that network device 40 is isolated from the other spine devices participating in the ESI-LAG.

CLI 60 may provide access for the administrator to turn off the core-isolation feature running on RPD 64. This may be desirable in the case where there are only two spine devices participating in the ESI-LAG. According to the disclosed techniques, CLI 61 may provide access for the administrator to turn on a core interface tracking feature that runs on LACPD 62 to monitor the core interface between network device 40 and another spine device participating in an ESI-LAG. Upon observing that the core interface has gone down, LACPD 62 determines that network device 40 is isolated from the other spine devices participating in the ESI-LAG.

Continuing the example where network device 40 is operating as a spine device of an ESI-LAG, upon determining that network device 40 is isolated, LACPD 62 compares the spine device ID of network device 40 against the primary spine device ID stored in spine device information 70 to determine whether network device 40 is the primary network device. If network device 40 is the primary spine device, LACPD 62 determines if all of the spine devices are isolated, e.g., by checking the all isolated state indicator stored in spine device information 70 or based on the local isolation state of network device 40). If all spine devices are isolated, LACPD 62 maintains the local ESI-LAG interface. Otherwise, LACPD 62 marks the ESI-LAG interface as down and uses LACP 54 to send an out-of-sync indication to the leaf devices.

Figure 5:
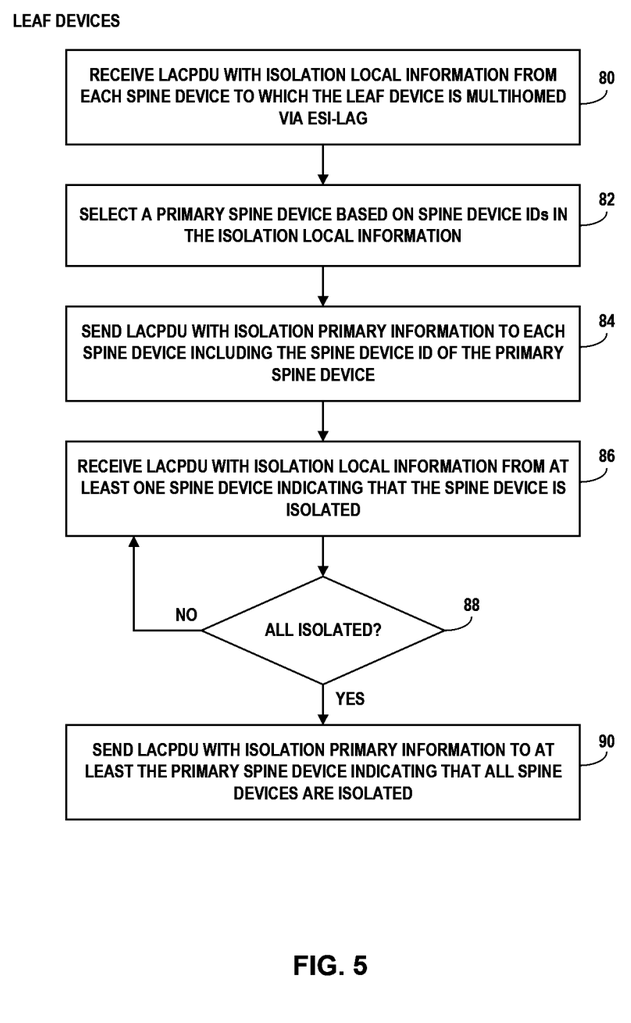
FIG. 5 is a flowchart illustrating an example operation of a leaf device in a multihomed environment, in accordance with the techniques of the disclosure.

FIG. 5 is a flowchart illustrating an example operation of a leaf device in a multihomed environment, in accordance with the techniques of the disclosure. The operation of FIG. 5 is described with respect to leaf device 16A from FIGS. 2 and 3. In other examples, the operation of FIG. 5 may be performed by any of leaf devices 16 from FIGS. 1-3.

Leaf device 16A receives, from each of spine devices 18 over ESI-LAG 30A, LACPDUs 34 carrying isolation local information including a spine device ID of the respective spine device and an indication of whether the respective spine device is isolated from the other spine devices in spine layer 26 (80). Leaf device 16A consolidates the isolation local information received from each of spine devices 18.

Leaf device 16A selects a primary spine device, e.g., spine device 18A, from among spine devices 18 based on the spine device IDs of spine devices 18 included in the received isolation local information (82). After selecting the primary spine device 18A, leaf device 16A sends, to each of spine devices 18 over ESI-LAG 30A, LACPDUs 32 carrying isolation primary information including the spine device ID of the primary spine device 18A (84).

The spine device IDs of spine devices 18 may be the loopback addresses of spine devices 18 or the LACP default system IDs of the spine devices 18. In one example, leaf device 16A may select the primary spine device as the one of spine devices 18 that has a lowest spine device ID from among the spine device IDs of spine devices 18. Leaf device 16A may select the primary spine device according to any logic as long as all of leaf devices 16 within leaf layer 24 select the same one of spine devices 18 within spine layer 26 as the primary spine device. The selection of the primary spine device is fixed and does not change based on the local isolation state of the selected spine device. However, in the case that leaf devices 16 stop receiving LACPDUs 34A from the primary spine device 18A, for example, each of leaf devices 16 will select a new primary spine device from among the remaining spine devices 18.

Based on the receipt, from at least one of spine devices 18, of LACPDUs 34 carrying the isolation local information including an indication that the at least one of spine devices 18 is isolated from the other spine devices (86), leaf device 16A determines whether all of spine devices 18 within spine layer 26 are isolated (88). For example, leaf device 16A consolidates the isolation local information received from spine devices 18 and analyzes the isolation state indications. If at least two of spine devices 18 have isolation states of "not isolated," then the all isolated state remains as "false." Conversely, if all of spine devices 18 have isolation states of "isolated," then the all isolated state becomes "true."

In response to determining that all of spine devices 18 are isolated (YES branch of 88), leaf device 16A sends, to at least primary spine device 18A, LACPDUs 32 carrying the isolation primary information including an indication that all spine devices are isolated (90). The indication included in the isolation primary information that all spine devices are isolated instructs primary spine device 18A to locally maintain ESI-LAG 30A with leaf device 16A. In this case, the LACPDU 34A received from primary spine device 18A may also carry an indication that a link between primary spine device 18A and leaf device 16A is in-sync with ESI-LAG 30A. Moreover, leaf device 16A continues to send, to primary spine device 18A, LACPDU 32A carrying the isolation primary information including an indication that all spine devices are isolated.

In response to determining that all of spine devices 18 are not isolated (NO branch of 88), leaf device 16A continues to receive LACPDUs 34 from spine devices 18 carrying the isolation local information (86). In this case, the isolated spine device (whether or not the isolated spine device is primary spine device 18A) will locally mark ESI-LAG 30A as down. As such, the LACPDUs 34 received from the isolated spine device may also carry an indication that a link between the isolated spine device and leaf device 16A is out-of-sync with ESI-LAG 30A. Moreover, leaf device 16A continues to send, to each of spine devices 18 that have an in-sync link with ESI-LAG 30A, LACPDUs 32 carrying the isolation primary information including an indication that all spine devices are not isolated.

In one example where the isolated spine device is primary spine device 18A, if all of spine devices 18 later become isolated (YES branch of 88), leaf device 16A sends, to at least primary spine device 18A, LACPDUs 32 carrying the isolation primary information including an indication that all spine devices are isolated (90). Leaf device 16A may send LACPDU 32A to primary spine device 18A despite primary spine device 18A having previously marked ESI-LAG 30A as locally down and sending the LACPDU 34A with the out-of-sync indication. In this case, the indication that all spine devices are isolated instructs primary spine device 18A to locally mark ESI-LAG 30A with leaf device 16A as up. Moreover, leaf device 16A may again receive LACPDU 34A from primary spine device 16A carrying an indication that the link between primary spine device 18A and leaf device 16A is in-sync with ESI-LAG 30A along with the isolation local information including the indication that primary spine device 18A is isolated.

Figure 6:
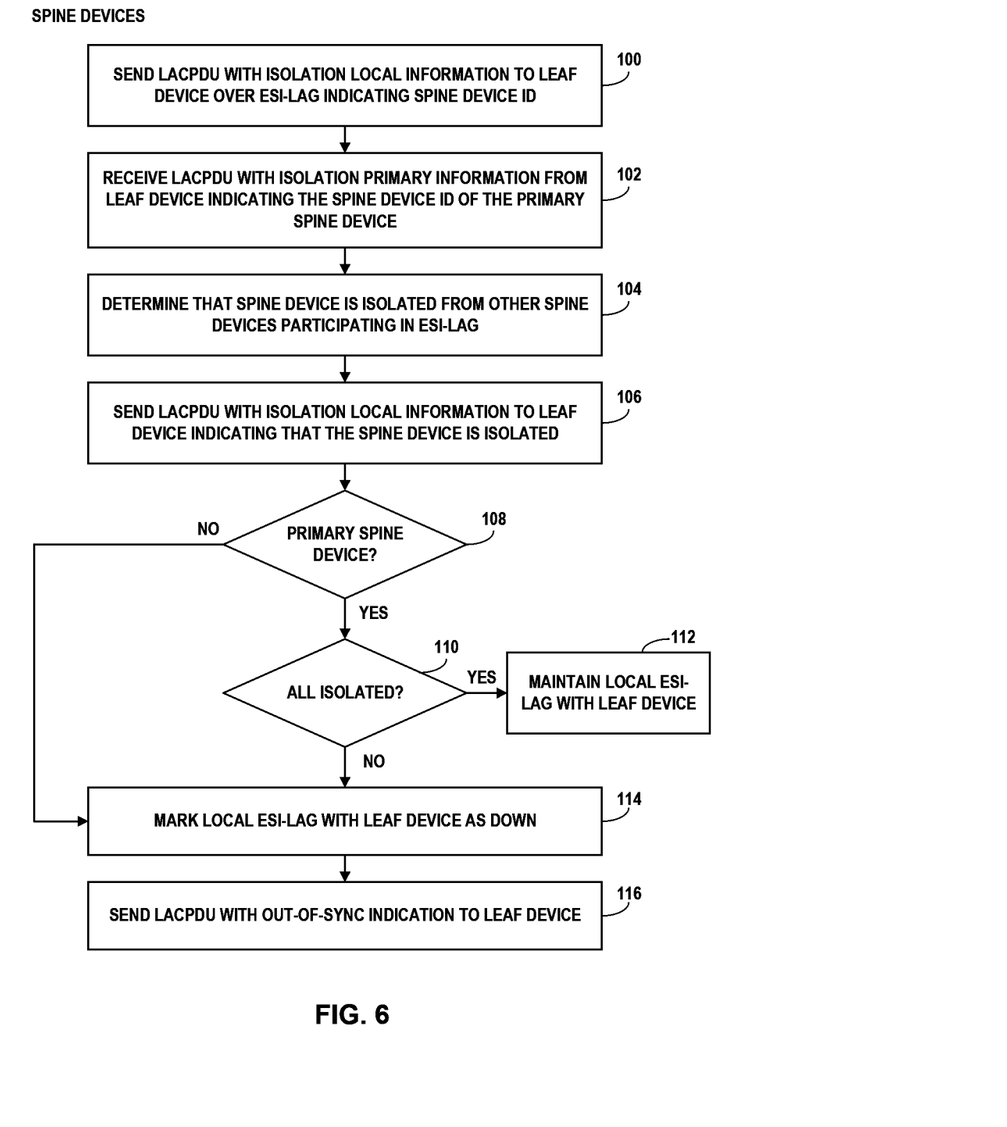
FIG. 6 is a flowchart illustrating an example operation of a spine device in a multihomed environment, in accordance with the techniques of the disclosure.

FIG. 6 is a flowchart illustrating an example operation of a spine device in a multihomed environment, in accordance with the techniques of the disclosure. The operation of FIG. 6 is described with respect to spine device 18A from FIGS. 2 and 3. In other examples, the operation of FIG. 6 may be performed by any of spine devices 18 from FIGS. 1-3.

Spine device 18A sends, to leaf device 16A over ESI-LAG 30A, LACPDUs 34A carrying isolation local information including a spine device ID of spine device 18A and an indication of whether spine device 18A is isolated from the other spine devices in spine layer 26 (100). Spine device 18A receives, from leaf device 16A over ESI-LAG 30A, LACPDUs 32A carrying isolation primary information including a spine device ID of a primary spine device selected from among spine devices 18 and an indication of whether all of spine devices 18 are isolated (102).

Spine device 18A then determines whether it is isolated from the other spine devices of spine devices 18 participating in ESI-LAG 30A (104). In one example, as illustrated in FIG. 2, spine devices 18 participating in ESI-LAG 30A are interconnected via a mesh of links 28 or through RR 14. In that example, spine device 18A may determining that it is isolated based on a determination that BGP connectivity is down to the other spine devices of spine devices 18 based on an internal core isolation notification on spine device 18A. In another example, as illustrated in FIG. 3, spine devices 18A and 18B are participating in ESI-LAG 30A and are directly connected via core interface 28. In that example, spine device 18A that it is isolated by monitoring a state of core interface 28 and determining that core interface 28 is down based on an observed change in the state of core interface 28.

In response to determining that spine device 18A is isolated, spine device 18A sends, to leaf device 16A over ESI-LAG 30A, LACPDUs 34A carrying the isolation local information including an indication that spine device 18A is isolated from the other spine devices (106). Spine device 18A then determines whether it is the primary spine device (108). For example, spine device 18A may compare its spine device ID, e.g., the loopback address of spine device 18A or the LACP default system ID of spine device 18A, to the spine device ID of the primary spine device included in the received isolation primary information to determine whether there is a match.

Spine device 18A also determines whether all of spine devices 18 are isolated based on the indication included in the received isolation primary information (110). In one example, upon receipt of LACPDUs 32A from leaf device 16A carrying isolation primary information with the indication that all of spine devices 18 are isolated, spine device 18A may determine that all of spine devices 18 are isolated. In another example where spine device 18A is one of only two spine devices participating in ESI-LAG 30A (as illustrated in FIG. 3), once spine device 18A determines that it is isolated from spine device 18B, spine device 18A may further determine that all spine devices 18 are isolated without having to receive the indication included in the isolation primary information from leaf device 16A.

In response to determining that spine device 18A is the primary spine device (YES branch of 108) and that all of spine devices 18 are isolated (YES branch of 110), spine device 18A locally maintains ESI-LAG 30A with leaf device 16A (112). In this case, spine device 18A may send LACPDUs 34A to leaf device 16A carrying an indication that a link between primary spine device 18A and leaf device 16A is in-sync with ESI-LAG 30A and carrying the isolation local information including the indication that primary spine device 18A is isolated.

In response to determining that spine device 18A is the primary spine device (YES branch of 108) and that all of spine devices 18 are not isolated (NO branch of 110), spine device 18A locally marks ESI-LAG 30A with leaf device 16A as down (114). In this case, spine device 18A may send LACPDUs 34A to leaf device 16A carrying an indication that a link between primary spine device 18A and leaf device 16A is out-of-sync with ESI-LAG 30A and carrying the isolation local information including the indication that primary spine device 18A is isolated (116).

In one example, after primary spine device 18A marks ESI-LAG 30A locally down, primary spine device 18A receives, from leaf device 16A, LACPDUs 32A carrying the isolation primary information including an indication that all spine devices are isolated. Primary spine device 18A may receive LACPDUs 32A from leaf device 16A despite primary spine device 18A having previously marked ESI-LAG 30A as locally down and sending the LACPDU 34A with the out-of-sync indication. In response to now determining that all of spine devices 18 are isolated, spine device 18A locally marks ESI-LAG 30A with leaf device 16A as up. In this case, spine device 18A may again send LACPDUs 34A to leaf device 16A carrying an indication that the link between primary spine device 18A and leaf device 16A is in-sync with ESI-LAG 30A and carrying the isolation local information including the indication that primary spine device 18A is isolated.

In response to determining that spine device 18A is not the primary spine device (NO branch of 108), spine device 18A locally marks ESI-LAG 30A with leaf device 16A as down (114). In this case, spine device 18A may send LACPDUs 34A to leaf device 16A carrying an indication that a link between primary spine device 18A and leaf device 16A is out-of-sync with ESI-LAG 30A and carrying the isolation local information including the indication that primary spine device 18A is isolated (116).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
sending, by a first spine device of two or more spine devices to which a leaf device is multihomed via a link aggregation group (LAG) and to the leaf device, isolation local information including a first spine device ID of the first spine device and an indication of whether the first spine device is isolated from the other spine devices of the two or more spine devices;
receiving, by the first spine device and from the leaf device, isolation primary information including a second spine device ID of a primary spine device selected from among the two or more spine devices and an indication of whether all of the two or more spine devices are isolated;
determining, by the first spine device, that the first spine device is isolated from the other spine devices of the two or more spine devices; and
in response to determining that the first spine device is the primary spine device and that all of the two or more spine devices are isolated, maintaining, by the first spine device, the LAG with the leaf device.

2. The method of claim 1, wherein the two or more spine devices are interconnected via a mesh or through a route reflector, and wherein determining that the first spine device is isolated comprises determining, by the first spine device, that border gateway protocol (BGP) connectivity is down to the other spine devices of the two or more spine devices based on an internal core isolation notification.

3. The method of claim 1, wherein the two or more spine devices consist of the first spine device and a second spine device directly connected via a core interface, and wherein determining that the first spine device is isolated comprises:
monitoring a state of the core interface between the first spine device and the second spine device; and
determining that the core interface is down based on an observed change in the state of the core interface.

4. The method of claim 1, further comprising, in response to determining that the first spine device is isolated:
determining that the first spine device is the primary spine device based on the first spine device ID of the first spine device matching the second spine device ID of the primary spine device; and
determining that all of the two or more spine devices are isolated based on the indication included in the isolation primary information received from the leaf device.

5. The method of claim 1, wherein, in response to determining that the first spine device is the primary spine device and that all of the two or more spine devices are isolated, sending the isolation local information comprises sending a link aggregation control protocol (LACP) data unit carrying an indication that a link between the first spine device and the leaf device is in-sync with the LAG and carrying the isolation local information including an indication that the first spine device is isolated.

6. The method of claim 1, further comprising, in response to determining that the first spine device is the primary spine device and that at least two of the other spine devices are not isolated, marking the LAG with the leaf device as down, wherein sending the isolation local information comprises sending a link aggregation control protocol (LACP) data unit carrying an indication that a link between the first spine device and the leaf device is out-of-sync with the LAG and carrying the isolation local information including an indication that the first spine device is isolated.

7. The method of claim 1, further comprising, after marking the LAG with the leaf device as down:
receiving, by the first spine device and from the leaf device, the isolation primary information including an indication that all of the two or more spine devices are isolated;
marking, by the first spine device, the LAG with the leaf device as up; and
sending, by the first spine device and to the leaf device, another LACP data unit carrying an indication that the link between the first spine device and the leaf device is in-sync with the LAG and carrying the isolation local information including the indication that the first spine device is isolated.

8. The method of claim 1, further comprising, in response to determining that the first spine device is not the primary spine device, marking the LAG with the leaf device as down, wherein sending the isolation local information comprises sending a link aggregation control protocol (LACP) data unit carrying an indication that a link between the first spine device and the leaf device is out-of-sync with the LAG and carrying the isolation local information including an indication that the first spine device is isolated.

9. A method comprising:
receiving, by a leaf device and from each spine device of two or more spine devices to which the leaf device is multihomed via a link aggregation group (LAG), isolation local information including a spine device ID of the respective spine device and an indication of whether the respective spine device is isolated from the other spine devices of the two or more spine devices;
selecting, by the leaf device, a primary spine device from among the two or more spine devices based on the spine device IDs of the two or more spine devices; and
in response to determining that all of the two or more spine devices are isolated, sending, by the leaf device and to at least the primary spine device, isolation primary information including an indication that all spine devices are isolated, wherein the indication that all spine devices are isolated instructs the primary spine device to maintain the LAG with the leaf device.

10. The method of claim 9, wherein selecting the primary spine device comprises selecting a spine device that has a lowest spine device ID from among the spine device IDs of the two or more spine devices.

11. The method of claim 9, further comprising, after selecting the primary spine device, sending, by the leaf device and to each spine device of the two or more spine devices, the isolation primary information including the spine device ID of the primary spine device.

12. The method of claim 9, wherein receiving the isolation local information comprises receiving, by the leaf device and from at least one spine device of the two or more spine devices, the isolation local information including an indication that the at least one spine device is isolated from the other spine devices of the two or more spine devices, the method further comprising determining, by the leaf device and based on the isolation local information, whether all of the two or more spine devices are isolated.

13. The method of claim 12, wherein the at least one spine device is not the primary spine device, and wherein receiving the isolation local information comprises receiving a link aggregation control protocol (LACP) data unit carrying an indication that a link between the at least one spine device and the leaf device is out-of-sync with the LAG and carrying the isolation local information including the indication that the at least one spine device is isolated.

14. The method of claim 12, wherein the at least one spine device is the primary spine device, wherein at least two of the other spine devices are not isolated, and wherein receiving the isolation local information comprises receiving a link aggregation control protocol (LACP) data unit carrying an indication that a link between the primary spine device and the leaf device is out-of-sync with the LAG and carrying the isolation local information including the indication that the primary spine device is isolated.

15. The method of claim 12, wherein the at least one spine device is the primary spine device, wherein all of the two or more spine devices are isolated, and wherein receiving the isolation local information comprises receiving a link aggregation control protocol (LACP) data unit carrying an indication that a link between the primary spine device and the leaf device is in-sync with the LAG and carrying the isolation local information including the indication that the primary spine device is isolated.

16. A network system comprising:
two or more spine devices connected to each other; and
a leaf device multihomed to the two or more spine devices via a link aggregation group (LAG),
wherein each spine device of the two or more spine devices is configured to send, to the leaf device, isolation local information including a spine device ID of the respective spine device and an indication of whether the respective spine device is isolated from the other spine devices of the two or more spine devices,
wherein the leaf device is configured to:
select a primary spine device from among the two or more spine devices based on the spine device IDs of the two or more spine devices, and
send, to at least the primary spine device, isolation primary information including a spine device ID of the primary spine device and an indication of whether all of the two or more spine devices are isolated, and
wherein the primary spine device is configured to, in response to determining that all of the two or more spine devices are isolated, maintain the LAG with the leaf device.

17. The system of claim 16, wherein the leaf device is multihomed to the two or more spine devices via an Ethernet segment identifier (ESI)-LAG, wherein the isolation local information and the isolation primary information each comprise a type-length-value (TLV) element of the link aggregation control protocol (LACP), and wherein the leaf device and the two or more spine devices periodically exchange LACP data units including the TLV elements over the ESI-LAG.

18. The system of claim 16, wherein the spine device IDs comprise one of loopback addresses of the two or more spine devices or link aggregation control protocol (LACP) default system IDs of the two or more spine devices.

19. The system of claim 16, wherein the primary spine device remains the primary spine device regardless of whether the primary spine device is isolated from the other spine devices of the two or more spine devices.

20. The system of claim 16, wherein the leaf device and the two or more spine devices comprise a fabric backbone within a data center, wherein the two or more spine devices support an overlay network, and wherein the overlay network comprises one of a Virtual Extensible Local Area Network (VXLAN)-Ethernet Virtual Private Network (EVPN) overlay network or a Multi-Protocol Label Switching (MPLS)-EVPN overlay network.

* * * * *

UNITED STATES PATENT AND TRADEMARK OFFICE
CERTIFICATE OF CORRECTION

PATENT NO. : 11,323,392 B1
APPLICATION NO. : 16/947099
DATED : May 3, 2022
INVENTOR(S) : Sushant Kumar, Aldrin Isaac and SelvaKumar Sivaraj It is certified that error appears in the above-identified patent and that said Letters Patent is hereby corrected as shown below:

In the Claims

Column 18 Line 27 (Claim 7): replace "The method of claim 1" with --The method of claim 6--

Signed and Sealed this
Twenty-seventh Day of June, 2023

Katherine Kelly Vidal
*Director of the United States Patent and Trademark Office*